United States Patent
Wu

(10) Patent No.: US 10,470,199 B2
(45) Date of Patent: Nov. 5, 2019

(54) DEVICE AND METHOD OF HANDLING A PDU SESSION IN INTER-SYSTEM MOBILITY BETWEEN A LTE SYSTEM AND A NR/5G SYSTEM

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 163 days.

(21) Appl. No.: 15/865,275

(22) Filed: Jan. 9, 2018

(65) Prior Publication Data

US 2018/0199355 A1 Jul. 12, 2018

Related U.S. Application Data

(60) Provisional application No. 62/444,781, filed on Jan. 10, 2017.

(51) Int. Cl.
*H04W 72/12* (2009.01)
*H04L 29/08* (2006.01)
(Continued)

(52) U.S. Cl.
CPC ... *H04W 72/1215* (2013.01); *H04L 29/08009* (2013.01); *H04W 36/0022* (2013.01);
(Continued)

(58) Field of Classification Search
CPC .. H04L 69/32; H04L 29/08009; H04W 36/14; H04W 36/0066; H04W 76/15;
(Continued)

(56) References Cited

U.S. PATENT DOCUMENTS

2015/0016382 A1  1/2015 Yuk
2016/0088664 A1  3/2016 Rydnell
(Continued)

FOREIGN PATENT DOCUMENTS

TW  201640870 A  11/2016
WO  2015/160329 A1  10/2015
(Continued)

OTHER PUBLICATIONS

Ericsson "PDU Session ID allocation in EPS S2-174197" Jun. 26-30, 2017 https://www.3gpp.org/DynaReport/TDocExMtg--S2-122--17866.htm.*
(Continued)

*Primary Examiner* — Maharishi V Khirodhar
*Assistant Examiner* — Kenneth P Hunt
(74) *Attorney, Agent, or Firm* — Winston Hsu

(57) ABSTRACT

A communication device for handling mobility between a new radio (NR)/fifth generation (5G) network and a long-term evolution (LTE) network comprises a storage device for storing instructions and a processing circuit coupled to the storage device. The processing circuit is configured to execute the instructions stored in the storage device. The instructions comprise connecting to the NR/5G network; communicating a Protocol Data Unit (PDU) Session identity/identifier (ID) identifying a PDU Session with the NR/5G network; communicating data of the PDU Session with the NR/5G network; disconnecting the NR/5G network, connect to the LTE network and performing a tracking area update (TAU) procedure with the LTE network; disconnecting the LTE network and connect to the NR/5G network, after performing the TAU procedure; and communicating the PDU Session ID identifying the PDU Session with the NR/5G network, when disconnecting the LTE network and connecting to the NR/5G network.

20 Claims, 4 Drawing Sheets

(51) Int. Cl.
*H04W 36/00* (2009.01)
*H04W 76/15* (2018.01)
*H04W 16/14* (2009.01)

(52) U.S. Cl.
CPC ....... *H04W 36/0066* (2013.01); *H04W 76/15* (2018.02); *H04W 16/14* (2013.01)

(58) Field of Classification Search
CPC ......... H04W 36/0022; H04W 72/1215; H04W 36/0033; H04W 60/00; H04W 16/14
See application file for complete search history.

(56) References Cited

U.S. PATENT DOCUMENTS

| | | | |
|---|---|---|---|
| 2017/0339609 A1* | 11/2017 | Youn | H04W 76/11 |
| 2018/0270715 A1* | 9/2018 | Lee | H04W 36/0022 |
| 2018/0270888 A1* | 9/2018 | Faccin | H04W 76/15 |
| 2019/0098536 A1* | 3/2019 | Qiao | H04W 36/0016 |
| 2019/0159157 A1* | 5/2019 | Gupta | H04W 60/005 |
| 2019/0182737 A1* | 6/2019 | Futaki | H04W 36/14 |
| 2019/0191348 A1* | 6/2019 | Futaki | H04W 36/12 |

FOREIGN PATENT DOCUMENTS

| | | |
|---|---|---|
| WO | 2016/028314 A1 | 2/2016 |
| WO | 2018/006017 A1 | 1/2018 |

OTHER PUBLICATIONS

Search Report dated May 15, 2018 for EP application No. 18150956.3, pp. 1-6.
ETRI, "Solution for updating the Level of Mobility", SA WG2 Meeting #114, S2-161665, Apr. 11-15, 2016, Sophia Antipolis, France, XP051086636, pp. 1-3.
Intel, "Update of Solution 6.1", SA WG2 Meeting #115, S2-163186, May 23-27, 2016, Nanjing, P.R. China, XP051116640, pp. 1-9.
Ericsson, "PDU Session ID allocation in EPS", SA WG2 Meeting #122, S2-174197, Jun. 26-30, 2017, San Jose Del Cabo, Mexico, XP051303052, pp. 1-6.
Huawei, Hisilicon, "Comparison of the options for session ID allocation and routing of subsequent SM signalling", SA WG2 Meeting #118, S2-167000, Nov. 14-18, 2016, Reno, Nevada, USA, XP051199958, pp. 1-8.
Nokia, KDDI, Qualcomm Incorporated, Huawei, "Updates on interworking and migration solution 18.2: Call flows", SA WG2 Meeting #117; S2-166101 (revision of S2-165869), Oct. 17-21, 2016, Kaohsiung, Taiwan.
Office action dated Nov. 21, 2018 for the Taiwan application No. 107100857, filing date Jan. 10, 2018, pp. 1-3.
3GPP TR 23.799 V14.0.0, Dec. 2016.

* cited by examiner

DEVICE AND METHOD OF HANDLING A PDU SESSION IN INTER-SYSTEM MOBILITY BETWEEN A LTE SYSTEM AND A NR/5G SYSTEM

CROSS REFERENCE TO RELATED APPLICATIONS

This application claims the benefit of U.S. Provisional Application No. 62/444,781, filed on Jan. 10, 2017, which is incorporated herein by reference.

BACKGROUND OF THE INVENTION

1. Field of the Invention

The present invention relates to a device and a method used in a wireless communication system, and more particularly, to a device and a method of handling a PDU session in inter-system mobility between a LTE system and a NR/5G system in a wireless communication system.

2. Description of the Prior Art

A next generation cellular system developed in 3rd Generation Partnership Project (3GPP) is called a new radio (NR) system or a fifth generation (5G) system. Inter-system mobility between a long-term evolution (LTE) system and the NR/5G system is an issue to be solved, to provide seamless service continuity for a user equipment (UE) moving between the two systems.

SUMMARY OF THE INVENTION

The present invention therefore provides a communication device and method for handling a PDU session in inter-system mobility between a LTE system and a NR/5G system in a wireless communication system to solve the abovementioned problem.

A communication device for handling mobility between a new radio (NR)/fifth generation (5G) network and a long-term evolution (LTE) network comprises a storage device for storing instructions and a processing circuit coupled to the storage device. The processing circuit is configured to execute the instructions stored in the storage device. The instructions comprise connecting to the NR/5G network; communicating a Protocol Data Unit (PDU) Session identity/identifier (ID) identifying a PDU Session with the NR/5G network; communicating data of the PDU Session with the NR/5G network; disconnecting the NR/5G network, connect to the LTE network and performing a tracking area update (TAU) procedure with the LTE network; disconnecting the LTE network and connect to the NR/5G network, after performing the TAU procedure; and communicating the PDU Session ID identifying the PDU Session with the NR/5G network, when disconnecting the LTE network and connecting to the NR/5G network.

A method for handling mobility between a NR/5G network and a LTE network comprises the NR/5G network connecting to a communication device; the NR/5G network communicating a PDU Session ID identifying a PDU Session with the communication device; the NR/5G network communicating data of the PDU Session with the communication device; the LTE network connecting to the communication device and performing a TAU procedure with the communication device; the NR/5G network connecting to the communication device, after the LTE network performing the TAU procedure; and the NR/5G network communicating the PDU Session ID identifying the PDU Session with the communication device, when connecting to the communication device after the LTE network performing the TAU procedure.

A network comprising a NR/5G network and a LTE network for handling mobility between the NR/5G network and the LTE network. The NR/5G network comprises a first storage device for storing instructions and a first processing circuit coupled to the first storage device. The first processing circuit is configured to execute the instructions stored in the first storage device. The instructions comprise connecting to a communication device; communicating a PDU Session ID identifying a PDU Session with the communication device; communicating data of the PDU Session with the communication device; connecting to the communication device, after the LTE network performing a TAU procedure; and communicating the PDU Session ID identifying the PDU Session with the communication device, when connecting to the communication device after the LTE network performing the TAU procedure. The LTE network comprises a second storage device for storing an instruction and a second processing circuit coupled to the second storage device. The second processing circuit is configured to execute the instruction stored in the second storage device. The instruction comprises connecting to the communication device and performing the TAU procedure with the communication device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
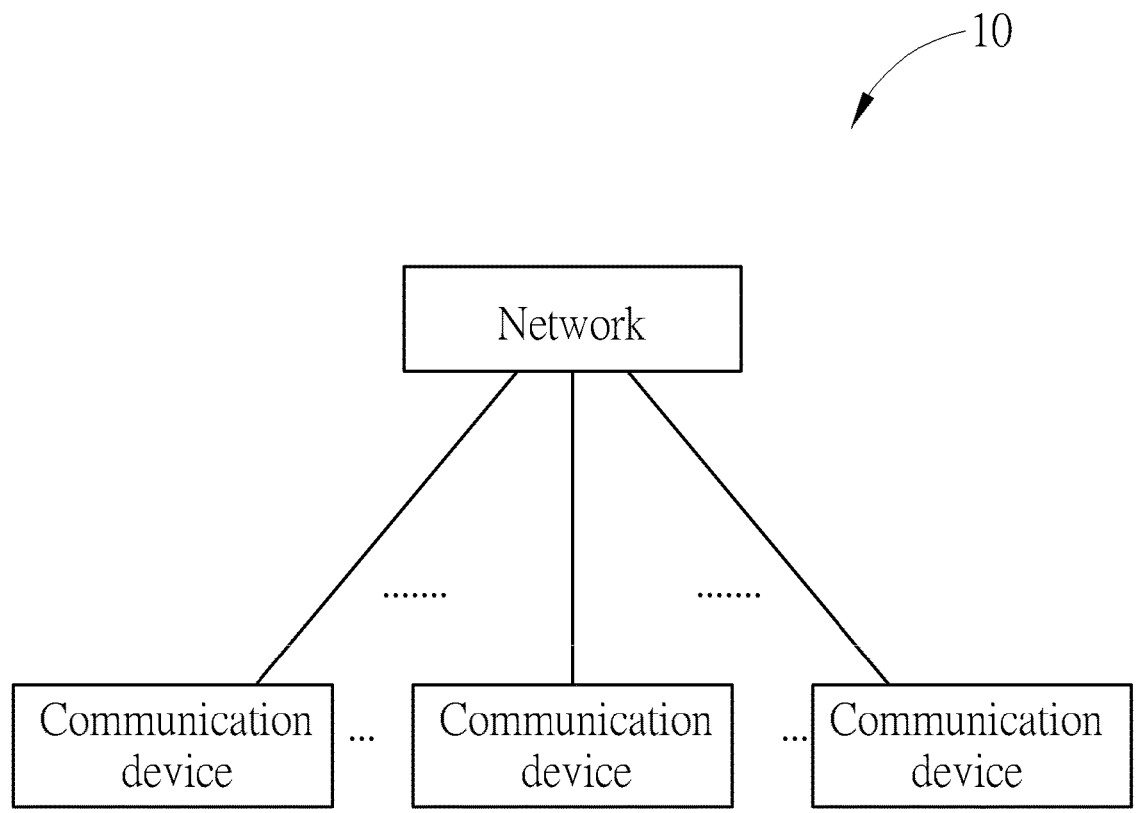
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. The network and a communication device may communicate with each other via one or more carriers of licensed band(s) and/or unlicensed band(s). The network and the communication device may communicate with each other via one or multiple cells (e.g., one or multiple carriers) belonging to one or multiple base stations (BSs). The abovementioned cells may be operated in the same or different duplexing modes, i.e., frequency-division duplexing (FDD), time-division duplexing (TDD) and flexible duplexing.

In FIG. 1, the network and the communication devices are simply utilized for illustrating the structure of the wireless communication system 10. Practically, the network includes an evolved universal terrestrial radio access network (E-UTRAN) including at least one evolved Node-B (eNB)

and a fifth generation (5G) network including at least one 5G BS (e.g., gNB) which employs orthogonal frequency-division multiplexing (OFDM) and/or non-OFDM and a transmission time interval (TTI) shorter than 1 ms (e.g., 1, 2, 3 or 4 OFDM symbols, 100 or 200 microseconds), to communicate with the communication devices.

A communication device may be a user equipment (UE), a mobile phone, a laptop, a tablet computer, an electronic book, a portable computer system, a vehicle, a ship or an aircraft. In addition, the network and the communication device can be seen as a transmitter or a receiver according to direction (i.e., transmission direction), e.g., for an uplink (UL), the communication device is the transmitter and the network is the receiver, and for a downlink (DL), the network is the transmitter and the communication device is the receiver.

Figure 2:
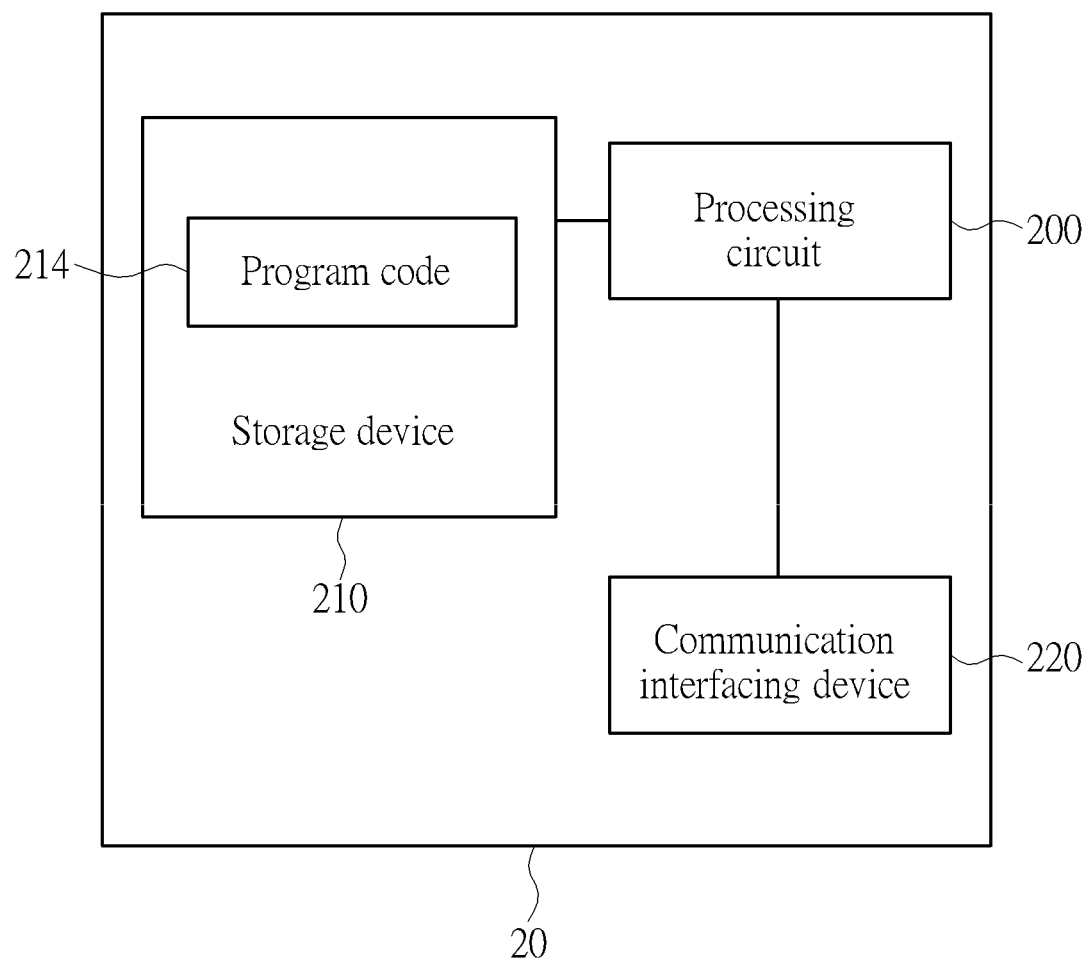
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing circuit 200 such as a microprocessor or Application Specific Integrated Circuit, a storage device 210 and a communication interfacing device 220. The storage device 210 may be any data storage device that may store a program code 214, accessed and executed by the processing circuit 200. Examples of the storage device 210 include but are not limited to a subscriber identity module, read-only memory, flash memory, random-access memory, hard disk, optical data storage device, non-volatile storage device, non-transitory computer-readable medium (e.g., tangible media), etc. The communication interfacing device 220 includes at least one transceiver and is used to transmit and receive signals (e.g., data, messages and/or packets) according to processing results of the processing circuit 200.

In the following examples, a UE is used to represent a communication device in FIG. 1, to simplify the illustration of the embodiments.

Figure 3:
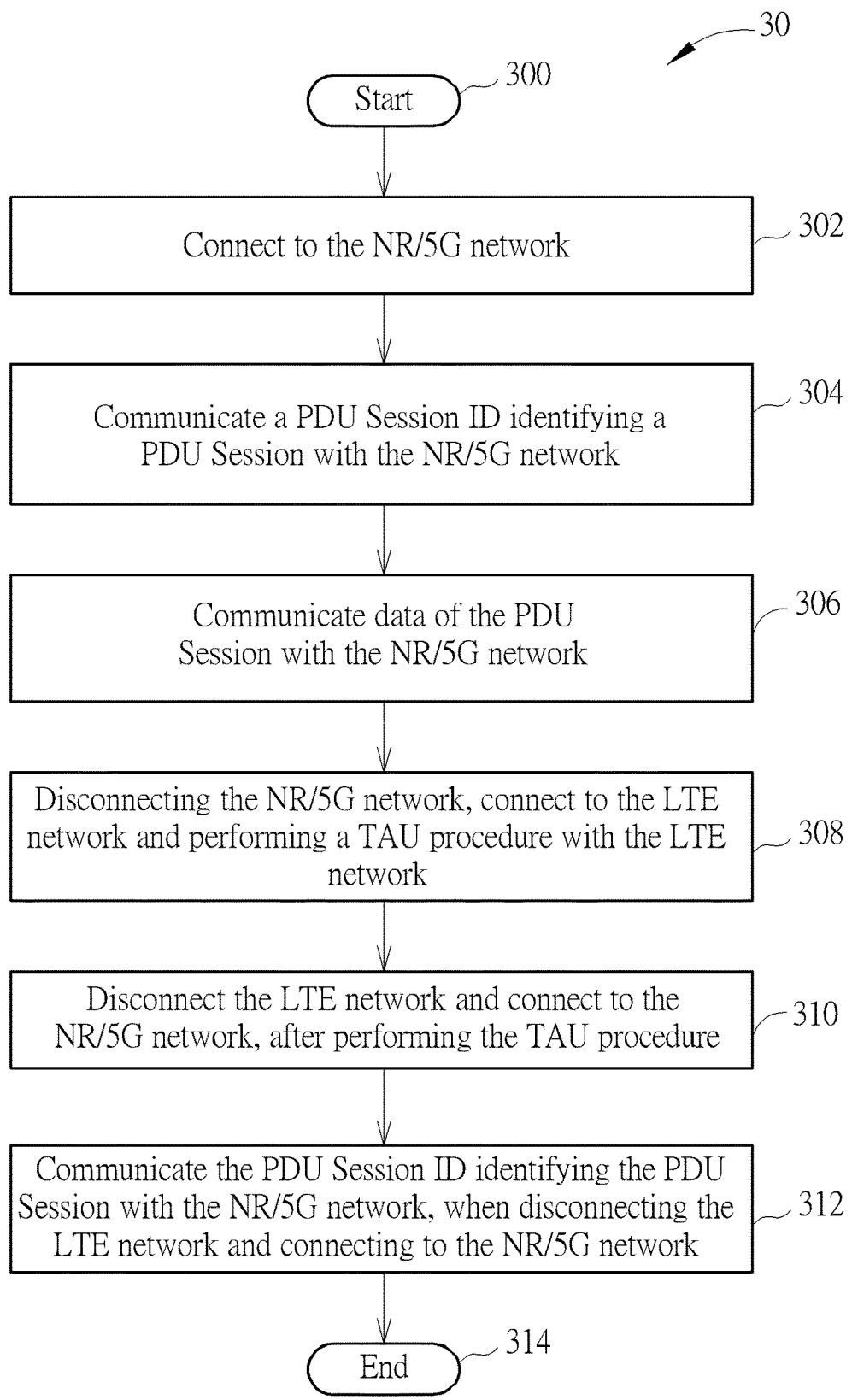
FIG. 3 is a flowchart of a process according to an example of the present invention.

FIG. 3 is a flowchart of a process 30 according to an example of the present invention. The process 30 is utilized in a UE shown in FIG. 1, to handle mobility between a new radio (NR)/5G network and a long-term evolution (LTE) network. The process 30 includes the following steps:

Step 300: Start.

Step 302: Connect to the NR/5G network.

Step 304: Communicate a Protocol Data Unit (PDU) Session identity/identifier (ID) identifying a PDU Session with the NR/5G network.

Step 306: Communicate data of the PDU Session with the NR/5G network.

Step 308: Disconnecting the NR/5G network, connect to the LTE network and performing a tracking area update (TAU) procedure with the LTE network.

Step 310: Disconnect the LTE network and connect to the NR/5G network, after performing the TAU procedure.

Step 312: Communicate the PDU Session ID identifying the PDU Session with the NR/5G network, when disconnecting the LTE network and connecting to the NR/5G network.

Step 314: End.

The following examples may be applied to the process 30.

In one example, the data of the PDU Session may or may not include a flow ID identifying a Quality of Service (QoS) flow associated to the PDU Session or the PDU Session ID. In one example, the data of the PDU Session may or may not include the PDU Session ID.

In one example, the UE keeps or maintains (e.g., does not release) the PDU Session ID, when connecting to the LTE network. Thus, the UE may use the PDU Session ID, when connecting back to the NR/5G network. In one example, the UE keeps or maintains a PDU Session context identified by the PDU Session ID. In one example, the UE keeps or maintains a QoS flow context identified by the PDU Session ID or the flow ID.

In one example, the instruction of communicating (e.g., transmitting or receiving) the PDU Session ID identifying the PDU Session with the NR/5G network in process 30 includes communicating a Non-Access Stratum (NAS) message with the NR/5G network, wherein the NAS message includes an information element (IE) indicating the PDU Session ID.

In one example, the NAS message is a NR/5G mobility management (MM) message. In one example, the MM message is a service request message, a service accept message, a TAU request message or a TAU accept message.

In one example, the UE transmits the service request message to the NR/5G network, and the NR/5G network transmits the service accept message or a NR/5G radio resource control (RRC) message (e.g., RRC Reconfiguration message) to the UE. In one example, the UE transmits the TAU request message to the NR/5G network, and the NR/5G network transmits the TAU accept message to the UE in response to the TAU request message. It should be noted that the TAU request message and the TAU accept message are used for a mobility management of the UE (e.g., knowing in which area the UE locates) in the NR/5G network. In one example, the IE indicates a PDU Session context status in the MM message. When receiving the PDU Session ID in the MM message, the NR/5G network keeps or maintains the PDU Session context identified by the PDU Session ID for the UE.

In one example, the NAS message is a NR/5G session management (SM) message. In one example, the SM message is an activate QoS flow context request, an activate QoS flow context accept, a PDU session resource allocation request, a PDU session resource modification request, a QoS flow resource allocation request, a QoS flow resource modification request, a deactivate QoS flow context request, a deactivate QoS flow context accept, a modify QoS flow context request, a modify QoS flow context reject, a modify QoS flow context accept, a Deactivate PDU Session Request, a Deactivate PDU Session Accept, a SM information request or a SM information response.

In one example, when receiving the PDU Session ID in the SM message, the UE or the NR/5G network operates the PDU Session context identified by the PDU Session ID according to a purpose of the SM message. For example, the UE or the NR/5G network transmits the Deactivate PDU Session Request to the NR/5G network or the UE, to request a release of the PDU Session identified by the PDU Session ID. Then, the NR/5G network or the UE transmits the Deactivate PDU Session Accept to the UE or the NR/5G network in response to the Deactivate PDU Session Request. In one example, the UE transmits the QoS flow resource allocation request to the NR/5G network, to request an allocation of a QoS flow context (or resource). The NR/5G network transmits the activate QoS flow context request to the UE, to request an activation of the QoS flow context associated to the PDU session or the PDU session ID. The UE transmits the activate QoS flow context accept in response to the activate QoS flow context request.

In one example, the QoS flow resource allocation request, the activate QoS flow context request and the activate QoS flow context accept include the PDU Session ID such that the UE and the NR/5G network associate the QoS flow context to the PDU Session. In one example, at least one of the QoS flow resource allocation request, the activate QoS flow context request and the activate QoS flow context accept includes a QoS flow ID. The "QoS flow" may be replaced by "PDU flow" or "flow".

In one example, the UE connects to a first BS of the NR/5G network. The UE transmits an Activate PDU Session Request message including the PDU Session ID identifying the PDU Session to the NR/5G network. The UE receives an Activate PDU Session Accept message including the PDU Session ID from the NR/5G network, to indicate that the PDU session is activated. The Activate PDU Session Accept message assigns a PDU address (e.g., an Internet Protocol (IP) address) to the UE. The UE communicates the data of the PDU Session with the first BS of the NR/5G network according to the PDU address. Then, the UE connects to the LTE network according to a first handover or a first cell selection (or reselection) to a first cell of the LTE network. Then, the UE connects back to the NR/5G network according to a second handover or a second cell selection (or reselection) to a second cell of the NR/5G network.

In case of the first handover, the UE receives a first handover command message from the first BS. The first handover command message (e.g., LTE RRCConnectionReconfiguration) configures the UE to hand over to the first cell of the LTE network. The UE connects to the first cell (controlled by a second BS) of the LTE network and performs the TAU procedure with the LTE network by transmitting the TAU request message to the LTE network. Then, the UE receives the TAU accept message from the LTE network in response to the TAU request message. The UE may or may not transmit a TAU complete message to the LTE network in response to the TAU accept message. The UE communicates (e.g., transmits or receives) data (e.g., IP packets) with the LTE network according to the PDU address, when connecting to the LTE network.

In case of the second handover, the UE receives a second handover command message (e.g., NR/5G RRC Reconfiguration message) from the second BS or a third BS of the LTE network. The second handover command message configures the UE to hand over to the second cell of the NR/5G network. The UE connects to the second cell (e.g., controlled by a BS) of the NR/5G network. When (or after) connecting back to the NR/5G network, the UE communicates (e.g., transmits or receives) the NAS message with (e.g., to or from) the NR/5G network, wherein the NAS message includes the IE indicating (or including) the PDU Session ID. When (or after) connecting back to the NR/5G network, the UE communicates the data of the PDU session with the NR/5G network according to the PDU address. The data may or may not include the PDU Session ID.

In one example, the UE releases at least one of a physical layer configuration, a Medium Access Control (MAC) layer configuration, a Radio Link Control (RLC) configuration, a Packet Data Convergence Protocol (PDCP) configuration, a radio bearer (RB) configuration, a timer configuration and a discontinuous reception (DRX) configuration which are received from the NR/5G network, when connecting to the LTE network.

Figure 4:
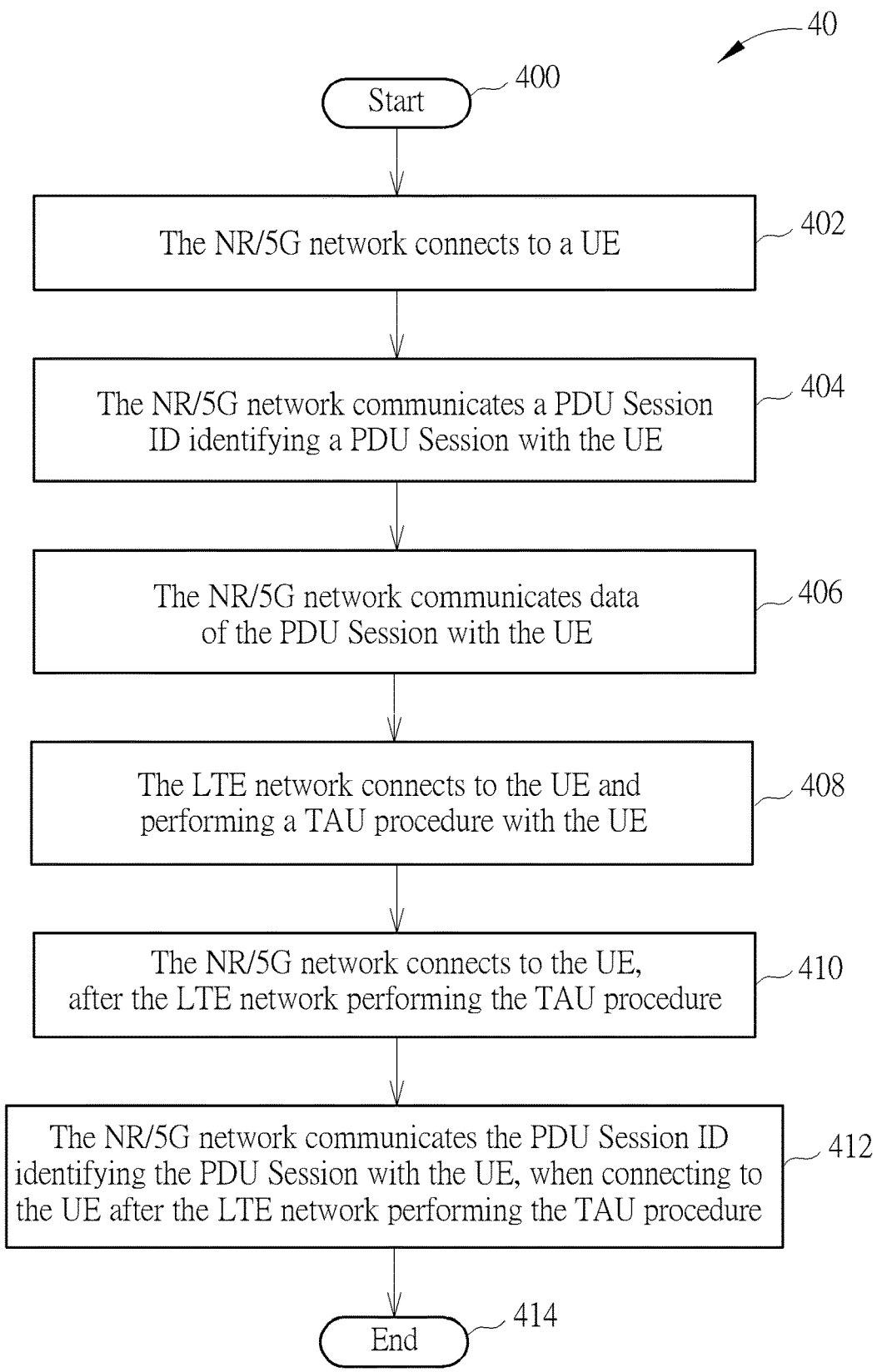
FIG. 4 is a flowchart of a process according to an example of the present invention.

FIG. 4 is a flowchart of a process 40 according to an example of the present invention. The process 40 is utilized in a network including a NR/5G network and a LTE network, shown in FIG. 1, to handle mobility between the NR/5G network and the LTE network. The process 40 includes the following steps:

Step 400: Start.
Step 402: The NR/5G network connects to a UE.
Step 404: The NR/5G network communicates a PDU Session ID identifying a PDU Session with the UE.
Step 406: The NR/5G network communicates data of the PDU Session with the UE.
Step 408: The LTE network connects to the UE and performing a TAU procedure with the UE.
Step 410: The NR/5G network connects to the UE, after the LTE network performing the TAU procedure.
Step 412: The NR/5G network communicates the PDU Session ID identifying the PDU Session with the UE, when connecting to the UE after the LTE network performing the TAU procedure.
Step 414: End.

Examples of the process 30 may be applied to the process 40. The following examples may be applied to the process 40.

In one example, the data of the PDU Session may or may not include a flow ID identifying a QoS flow associated to the PDU Session or the PDU Session ID. In one example, the data of the PDU Session may or may not include the PDU Session ID.

In one example, the network (e.g., the LTE network or the NR/5G network) keeps or maintains (e.g., does not release) the PDU Session ID irrespective of that the LTE network or the NR/5G network connects to the UE. Thus, the network identifies a PDU Session context according to the PDU Session ID, when the NR/5G network connects to the UE. In one example, the network keeps or maintains a PDU Session context identified by the PDU Session ID irrespective of that the LTE network or the NR/5G network connects to the UE. In one example, the network keeps or maintains a QoS flow context identified by the PDU Session ID or a flow ID.

In one example, the instruction of the NR/5G network communicating the PDU Session ID identifying the PDU Session with the UE in process 40 includes the NR/5G network communicating a NAS message with the UE, wherein the NAS message includes an IE indicating the PDU Session ID. Details of communicating the NAS message can be referred to the process 30. The NR/5G communicates the data of the PDU session with the UE as described in the process 30, and is not narrated herein.

In one example, the NR/5G network releases at least one of a physical layer configuration, a MAC layer configuration, a RLC configuration, a PDCP configuration, a RB configuration, a timer configuration and a DRX configuration, when connecting to the LTE network.

The terminology of the messages above may be different from that in the NR/5G standards, since the NR/5G standards are not finalized. The NR/5G standards may have similar messages serving the same purposes as the messages in the processes above.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program code 214.

To sum up, the present invention provides a method and a communication device for handling a PDU Session in Inter-system Mobility between a LTE System and a NR/5G System. A UE does not release a PDU Session ID, when the UE connects to the LTE network instead of the NR/5G network. Thus, the problem of Inter-system mobility between the LTE system and the NR/5G system is solved, and the UE moving between the two systems have seamless service continuity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling mobility between a new radio (NR)/fifth generation (5G) network and a long-term evolution (LTE) network, comprising:
   a storage device; and
   a processing circuit, coupled to the storage device, wherein the storage device stores, and the processing circuit is configured to execute instructions of:
   connecting to the NR/5G network;
   communicating a Protocol Data Unit (PDU) Session identity/identifier (ID) identifying a PDU Session with the NR/5G network;
   communicating data of the PDU Session with the NR/5G network;
   disconnecting the NR/5G network, connecting to the LTE network and performing a tracking area update (TAU) procedure with the LTE network;
   disconnecting the LTE network and connecting to the NR/5G network, after performing the TAU procedure; and
   communicating the PDU Session ID identifying the PDU Session with the NR/5G network, when disconnecting the LTE network and connecting to the NR/5G network.

2. The communication device of claim 1, wherein the data of the PDU Session comprises a flow ID identifying a Quality of Service (QoS) flow associated to the PDU Session or the PDU Session ID.

3. The communication device of claim 1, wherein the data of the PDU Session comprises the PDU Session ID.

4. The communication device of claim 1, wherein the storage device further stores the instructions of:
   keeping the PDU Session ID, when connecting to the LTE network;
   keeping a PDU Session context identified by the PDU Session ID; and
   keeping a QoS flow context identified by the PDU Session ID or a flow ID.

5. The communication device of claim 1, wherein the instruction of communicating the PDU Session ID identifying the PDU Session with the NR/5G network comprises:
   communicating a Non-Access Stratum (NAS) message with the NR/5G network, wherein the NAS message comprises an information element (IE) indicating the PDU Session ID.

6. The communication device of claim 5, wherein the NAS message is a NR/5G mobility management (MM) message or a NR/5G session management (SM) message.

7. The communication device of claim 6, wherein the storage device further stores the instruction of:
   operating a PDU Session context identified by the PDU Session ID according to a purpose of the SM message, when receiving the PDU Session ID in the SM message.

8. The communication device of claim 1, wherein the storage device further stores the instructions of:
   connecting to a first base station (BS) of the NR/5G network;
   transmitting an Activate PDU Session Request message comprising the PDU Session ID identifying the PDU Session to the NR/5G network;
   receiving an Activate PDU Session Accept message comprising the PDU Session ID and assigning a PDU address from the NR/5G network, to indicate that the PDU session is activated;
   communicating the data of the PDU Session with the first BS of the NR/5G network according to the PDU address;
   connecting to the LTE network according to a first handover or a first cell selection to a first cell of the LTE network; and
   connecting to the NR/5G network according to a second handover or a second cell selection to a second cell of the NR/5G network.

9. The communication device of claim 1, wherein the storage device further stores the instruction of:
   releasing at least one of a physical layer configuration, a Medium Access Control (MAC) layer configuration, a Radio Link Control (RLC) configuration, a Packet Data Convergence Protocol (PDCP) configuration, a radio bearer (RB) configuration, a timer configuration and a discontinuous reception (DRX) configuration which are received from the NR/5G network, when connecting to the LTE network.

10. A method for handling mobility between a new radio (NR)/fifth generation (5G) network and a long-term evolution (LTE) network, comprising:
    the NR/5G network connecting to a communication device;
    the NR/5G network communicating a Protocol Data Unit (PDU) Session identity/identifier (ID) identifying a PDU Session with the communication device;
    the NR/5G network communicating data of the PDU Session with the communication device;
    the LTE network connecting to the communication device and performing a tracking area update (TAU) procedure with the communication device;
    the NR/5G network connecting to the communication device, after the LTE network performing the TAU procedure; and
    the NR/5G network communicating the PDU Session ID identifying the PDU Session with the communication device, when connecting to the communication device after the LTE network performing the TAU procedure.

11. The method of claim 10, wherein the data of the PDU Session comprises a flow ID identifying a Quality of Service (QoS) flow associated to the PDU Session or the PDU Session ID.

12. The method of claim 10, wherein the data of the PDU Session comprises the PDU Session ID.

13. The method of claim 10, further comprising:
    the LTE network or the NR/5G network keeping the PDU Session ID irrespective of that the LTE network or the NR/5G network connects to the communication device;

the LTE network or the NR/5G network keeping a PDU Session context identified by the PDU Session ID irrespective of that the LTE network or the NR/5G network connects to the communication device; and the LTE network or the NR/5G network keeping a QoS flow context identified by the PDU Session ID or a flow ID.

14. The method of claim 10, wherein the instruction of the NR/5G network communicating the PDU Session ID identifying the PDU Session with the communication device comprises:

the NR/5G network communicating a Non-Access Stratum (NAS) message with the communication device, wherein the NAS message comprises an information element (IE) indicating the PDU Session ID.

15. The method of claim 10, further comprising:

the NR/5G network releasing at least one of a physical layer configuration, a Medium Access Control (MAC) layer configuration, a Radio Link Control (RLC) configuration, a Packet Data Convergence Protocol (PDCP) configuration, a radio bearer (RB) configuration, a timer configuration and a discontinuous reception (DRX) configuration, when the LTE network connects to the communication device.

16. A network for handling mobility between a new radio (NR)/fifth generation (5G) network and a long-term evolution (LTE) network, comprising:

the NR/5G network, comprising:

a first storage device; and a first processing circuit, coupled to the first storage device, wherein the first storage device stores, and the first processing circuit is configured to execute instructions of:

connecting to a communication device;

communicating a Protocol Data Unit (PDU) Session identity/identifier (ID) identifying a PDU Session with the communication device;

communicating data of the PDU Session with the communication device;

connecting to the communication device, after the LTE network performing a tracking area update (TAU) procedure; and communicating the PDU Session ID identifying the PDU Session with the communication device, when connecting to the communication device after the LTE network performing the TAU procedure; and the LTE network, comprising:

a second storage device; and a second processing circuit, coupled to the second storage device, wherein the second storage device stores, and the second processing circuit is configured to execute an instruction of:

connecting to the communication device and performing the TAU procedure with the communication device.

17. The network of claim 16, wherein the data of the PDU Session comprises a flow ID identifying a Quality of Service (QoS) flow associated to the PDU Session or the PDU Session ID.

18. The network of claim 16, wherein the data of the PDU Session comprises the PDU Session ID.

19. The network of claim 16, wherein the first storage device or the second storage device further stores the instructions of:

keeping the PDU Session ID irrespective of that the LTE network or the NR/5G network connects to the communication device;

keeping a PDU Session context identified by the PDU Session ID irrespective of that the LTE network or the NR/5G network connects to the communication device; and keeping a QoS flow context identified by the PDU Session ID or a flow ID.

20. The network of claim 16, wherein the instruction of communicating the PDU Session ID identifying the PDU Session with the communication device comprises:

communicating a Non-Access Stratum (NAS) message with the communication device, wherein the NAS message comprises an information element (IE) indicating the PDU Session ID.

* * * * *